United States Patent [19]
Verheijen et al.

[11] 3,891,678
[45] June 24, 1975

[54] PREPARATION OF ALKYLATED OR NON-ALKYLATED DIHYDROCOUMARIN TOGETHER WITH THE CORRESPONDING ALKYLATED, OR NON-ALKYLATED, COUMARIN

[75] Inventors: Egidius J. M. Verheijen; Jozef A. Thoma, both of Sittard; Johannes J. M. Deumens, Limbricht, all of Netherlands

[73] Assignee: Stamicarbon, B.V., Geleen, Netherlands

[22] Filed: Aug. 24, 1973

[21] Appl. No.: 391,516

[30] Foreign Application Priority Data
Aug. 31, 1972  Netherlands........................ 7211839

[52] U.S. Cl............................ 260/343.2 R; 252/522
[51] Int. Cl................................................ C07d 7/26
[58] Field of Search ............................ 260/343.2 R

[56] References Cited
UNITED STATES PATENTS
3,442,910   5/1969   Thweatt........................... 260/343.2
3,521,187   7/1970   Snavely et al................. 260/343.2 X OTHER PUBLICATIONS
Berichte, Vol. 70, p. 237, (1937).

Primary Examiner—John M. Ford
Attorney, Agent, or Firm—Cushman, Darby & Cushman

[57]  ABSTRACT

A process for dehydrogenating hexahydrocoumarin or alkylated derivatives thereof is disclosed, wherein the selection of specific process conditions allows substantial amounts of coumarin or alkylated derivatives thereof to be produced along with dihydrocoumarin or alkylated derivatives thereof. The hexahydrocoumarin or derivatives are contacted with the catalyst at about the dehydrogenation temperature and then are dehydrogenated in the presence of a Group VIII metal dehydrogenation catalyst in the liquid phase at a temperature of 200°–375°C while removing hydrogen from the reaction zone, and the reaction product contains coumarin or alkylated derivatives thereof in a molar ratio of coumarin compounds:dihydrocoumarin compounds of at least 1:5.

Coumarin and dihydrocoumarin, as well as alkylated derivatives thereof, are known compounds which are used in the fragance industry.

8 Claims, No Drawings

PREPARATION OF ALKYLATED OR
NON-ALKYLATED DIHYDROCOUMARIN
TOGETHER WITH THE CORRESPONDING
ALKYLATED, OR NON-ALKYLATED, COUMARIN

BACKGROUND OF THE INVENTION

The present invention relates to a process for producing dihydrocoumarin and alkylated derivatives thereof and coumarin and alkylated derivatives thereof.

U.S. Pat. No. 3,442,910 discloses that dihydrocoumarin can be prepared by the simultaneous cyclization and dehydrogenation of the lower alkyl esters of 2-oxo-cyclohexane propionic acid. Furthermore, the alkylated dihydrocoumarin derivatives may be produced by the process of this patent starting from the corresponding alkylated derivative of the lower alkyl ester of 2-oxo-cyclohexane propionic acid.

The main disadvantage of the process of U.S. Pat. No. 3,442,910 is that the esters used as starting materials are very expensive compounds, requiring a particularly complicated preparation technique, as disclosed by the aforesaid patent. In addition, the resulting reaction product of this known method is difficult to process, because the alcohol formed from the ester group must be recovered as a by-product.

According to U.S. Pat. No. 3,442,910, the keto acid itself (that is, the 2-oxo-cyclohexane propionic acid or alkylated derivatives thereof) may also be used as a starting material in the process. It would be expected that such use of the keto acid would be a significant improvement, as the keto acid may be prepared using simple techniques (note, e.g. U.S. Pat. No. 2,850,519). In practice, however, the efficiency of the process is too low for commercial utilization in view of the very low yields obtained when using the keto acids.

Co-pending commonly assigned U.S. patent application, Ser. No. 335,114, discloses that dihydrocoumarin and alkylated derivatives thereof may be prepared at substantially lower cost by the catalytic dehydrogenation of hexahydrocoumarin or alkylated derivatives thereof. The dehydrogenation is preferably carried out in the gas phase and is at a temperature between 150° and 400°C, preferably between 175° and 325°C. The process of this co-pending application produces a very slight amount of coumarin or alkylated derivatives thereof as a by-product.

SUMMARY OF THE INVENTION

The present invention involves the use of certain process conditions in order to unexpectedly increase the co-production of coumarin or alkylated derivatives thereof in the general process of the aforesaid co-pending application, Ser. No. 335,114. The starting materials and the catalyst are contacted at a temperature of 200°–375°C. The dehydrogenation reaction is conducted in the liquid phase and at a temperature of 200°–375°C, with removal of hydrogen, to produce a reaction mixture containing coumarin and/or alkylated coumarin derivatives, wherein the molar ratio of coumarin (or alkylated derivative thereof): dihydrocoumarin (or alkylated derivative thereof) is at least 1:5.

DETAILED DESCRIPTION OF THE INVENTION

It has unexpectedly been found that the selection of certain catalytic dehydrogenation conditions in the dehydrogenation of hexahydrocoumarin or alkylated derivatives thereof results in the co-production of substantial amounts of coumarin or coumarin derivatives together with the dihydrocoumarin or dihydrocoumarin derivatives. The process involves dehydrogenating at least one compound selected from the group consisting of hexahydrocoumarin and alkylated derivatives thereof, which can be represented by the formula as indicated in claim 1 of this application, wherein $R_1$, $R_2$, $R_3$, $R_4$, $R_5$ and $R_6$ each independently represent hydrogen or lower alkyl, provided that the total number of carbon atoms in $R_1 - R_6$ inclusive is at most 10. The compound of the formula is subjected to dehydrogenation in the liquid phase in contact with a dehydrogenation catalyst at temperatures of 200°–375°C, with hydrogen removal from the reaction zone.

The starting material used in the process of the present invention may be prepared in the known manner by converting the corresponding keto acid into the corresponding lactone, e.g. by lactonisation of 2-oxo-cyclohexane propionic acid to hexahydrocoumarin. Note, e.g., Zhurn. Obschei Khim. vol. 26, 1965 pages 861–865, the disclosure of which is hereby incorporated by reference.

As used herein, lower alkyl designates an alkyl radical, either straight chained or branched, having from 1 to about 4 carbon atoms, such as methyl, ethyl, propyl, isopropyl, butyl, t-butyl and isobutyl.

The metal dehydrogenation catalysts which are used in the process of the present invention are known. These catalysts are Group VIII of the Periodic Table metals, such as palladium, platinum, iridum, rhodium, nickel, cobalt and ruthenium, especially palladium, platinum and rhodium. The amount of catalyst which is used may be varied, preferably from about 0.001 to about 1.0 weight percent, calculated as metal, based on the weight of the starting material. Usually the catalysts are supported on a carrier, such as silica gel, aluminum oxide, magnesium oxide, carbon, and mixtures of these or other carriers. Carbon is highly suitable for use as the carrier. The amount of carrier may vary, but normally is chosen such that the metal content of the supported catalyst will be from 0.5 to 20 weight percent, based on the overall weight of catalyst and carrier. A particularly preferred catalyst is palladium supported on carbon. The temperature at which the dehydrogenation process of the present invention may be conducted may be varied within the above-mentioned limits, with preference for a temperature between 240 and 300°C, as this latter temperature range allows a good yield to be obtained at a very satisfactory reaction rate.

It has been found that the reaction yield is very favorably influenced if the compound to be dehydrogenated, i.e. the starting material, and the catalyst are brought into contact with each other at a temperature within the aforesaid dehydrogenation temperature range, i.e. between 200° and 375°C, preferably between 240° and 300°C. This preferred embodiment can be realized in practice by preheating the compound which is to be dehydrogenated and/or the catalyst, preferably to a temperature which is about the dehydrogenation temperature.

It is critical that the dehydrogenation reaction be conducted in the liquid phase, unlike the process of co-pending application Ser. No. 335,114, wherein the liquid phase may be used but the gas phase is strongly preferred. Also, hydrogen must be removed from the reaction zone.

The pressure at which the dehydrogenation reaction is conducted is not critical and may vary widely, for instance, up to about 100 atmospheres. Of course, the pressure, considered with the dehydrogenation reaction temperature, is chosen at such a level that the dehydrogenation is conducted in the liquid phase. In many instances, atmospheric pressures may be used. The ratio between the amounts of dihydrocoumarin and coumarin (including their alkylated derivatives, respectively) in the reaction product obtained by the process of the present invention may vary and depends, upon other things, on the amount of catalyst and the reaction time. If all other conditions are kept equal, an increase in the amount of catalyst and/or an increase in the reaction time will produce a reaction mixture containing more coumarin and less dehydrocoumarin. The molar ratio between dihydrocoumarin compounds and coumarin compounds in the reaction mixture will normally be between 5:1 and 1:5.

To insure that the hydrogen formed in the dehydrogenation reaction is discharged from the reaction zone, an inert gas such as, for instance, nitrogen, may be passed through the reaction mixture. If all other reaction conditions are kept equal, and oxygen or an oxygen-containing gas such as air is passed through the reaction mixture, the molar ratio of dihydrocoumarin:coumarin in the reaction mixture will decrease.

The process according to the present invention may be conducted in various ways, for instance, by adding the starting compound to the catalyst. If desired, the catalyst may be suspended in a liquid diluent, and the desired reaction product is a very suitable liquid diluent.

The reaction mixture may be further processed in various ways, for instance, by allowing the catalyst material to settle and then decanting the liquid reaction product. Alternatively, the catalyst material may be removed from the catalyst mixture by filtration or centrifuging. The recovered catalyst material may be reused several times. The older the catalyst (i.e. the longer the catalyst material has been in use), the higher will be the dihydrocoumarin: coumarin molar ratio in the resulting reaction product.

After removal of the catalyst material, the reaction mixture may, if desired, be separated by fractional distillation, with simultaneous recovery of dihydrocoumarin or alkylated derivatives thereof, and coumarin or alkylated derivatives thereof. The dihydrocoumarin, or alkylated derivatives thereof, may, if desired, be further dehydrogenated to coumarin or alkylated coumarin derivatives by the process described in U.S. Pat. No. 3,442,910, the disclosure of which is hereby incorporated by reference. Coumarin has a pleasant, fragrant odor, resembling that of vanilla beans, and is used as a flavoring agent and as an odorant in the perfume industry.

EXAMPLES OF THE INVENTION

The invention will be understood more readily by reference to the following examples; however, these examples are intended to illustrate the invention and are not to be construed to limit the scope of the invention.

EXAMPLE 1

10 g of 3,4-dihydrocoumarin and 500 mg of palladium-on-carbon (containing 5 weight percent of palladium metal) were introduced into a 100 ml flask provided with a stirrer, a gas inlet tube and a reflux cooler.

Air was passed through the flask at the rate of 4 liters per hour and the mixture was heated, with simultaneous stirring. The liquid in the shell of the reflux cooler was maintained at 80°C.

When the temperature in the flask had risen to about 260°C, 20 g of 3,4,5,6,7,8-hexahydrocoumarin were introduced into the flask over a period of 3 hours 45 minutes. 1.6 g of water and 2.5 g of volatile organic compounds (mainly 2-ethylphenol and ethylbenzene) were discharged through the reflux cooler. After the addition of hexahydrocoumarin was complete, stirring was continued for another 15 minutes at approximately 264°C. The reaction mixture was then cooled to room temperature, the catalyst mass was filtered off, and the filtrate was analyzed with a mass spectrometer and a gas chromatograph.

The filtrate contained 1 g of ethylphenol, 0.2 g of octahydrocoumarin, 17.2 g of 3,4-dihydrocoumarin and 6.3 g of coumarin. No hexahydrocoumarin was detected in the filtrate.

From the above results, it will be readily calculated that the conversion was 100% and the yield of 3,4-dihydrocoumarin and coumarin was 70%.

Example 2

500 mg of palladium-on-carbon (having a content of 5 weight percent of palladium metal) was introduced into a 100 ml flask, provided with a stirrer, a gas inlet tube and a reflux cooler.

The catalyst in the flask was heated to 240°C, after which 40 g of 3,4,5,6,7,8-hexahydrocoumarin were added over a period of two hours, with stirring. During the addition of the hexahydrocoumarin, the temperature of the flask contents was maintained at 245°-255°C, and air was passed through the reaction mixture at a rate of 4 liters per hour.

After the hexahydrocoumarin addition was completed, the reaction flask contents were maintained at 240°C for 2 hours, with stirring. 2.8 g of water and 4.7 g of volatile organic products were discharged through the reflux cooler (the coolant was maintained at a temperature of 80°C).

The flask contents were then cooled to room temperature and the reaction mixture was filtered to recover catalyst therefrom. The filtrate was analyzed on a gas chromatograph and a mass spectrometer. No hexahydrocoumarin was detected in the filtrate, which contained 12.2 g of 3,4-dihydrocoumarin and 15.2 g of coumarin in addition to 1.5 g of 2-ethylphenol, 0.3 g of octahydrocoumarin and 3 g of the ester of 2-ethylphenol and β-cyclohexylpropionic acid.

From the above data, the yield of 3,4-dihydrocoumarin and coumarin was 70.9% at a conversion of 100%.

EXAMPLE 3

Example 2 was repeated, using the catalyst mass recovered from the filtration step of Example 2. An additional 40 g of 3,4,5,6,7,8-hexahydrocoumarin was dehydrogenated.

The resulting filtrate contained 13.3 g of 3,4-dihydrocoumarin, 14.9 g of coumarin and no hexahydrocoumarin, resulting in a yield of 3,4-dihydrocoumarin and coumarin of 73% at a conversion of 100%.

Example 4

500 mg of palladium-on-carbon (having a content of 5 weight percent of palladium metal) was introduced into a 100 ml flask, provided with a stirrer, a gas inlet tube and a reflux cooler.

A stream of 4 liters per hour of nitrogen was introduced into the gas inlet tube, with simultaneous stirring, and the flask was heated to 245°C, whereupon 20 g of 3,4,5,6,7,8-hexahydrocoumarin was introduced over a period of 3 hours and 45 minutes, maintaining the flask conditions. After the hexahydrocoumarin addition was completed, the reaction conditions were maintained for another 15 minutes and then the reaction mixture was cooled to room temperature and treated the same way as Example 1. 9.2 g of 3,4-dihyrocoumarin and 4.5 g of coumarin were obtained, for a conversion of 100%.

The yield of 3,4-dihydrocoumarin and coumarin was 70.7%.

Comparative Example A (Catalyst and starting material mixed at room temperature)

20 g of 3,4,5,6,7,8-hexahydrocoumarin and 500 mg of palladium-on-carbon (having a content of 5 weight percent of palladium metal) were introduced at room temperature into a 100 ml flask, provided with a stirrer, a gas inlet tube and a reflux cooler.

The flask contents were heated at 245°–265°C for 4 hours with simultaneous stirring, while air was passed through the flask at the rate of 4 liters per hour. The reflux cooler coolant was maintained at a temperature of 80°C and 2 g of volatile organic compounds and 0.8 g of water were discharged through the reflux cooler. The resulting reaction mixture was treated by the procedure of Example 1.

The resulting filtrate contained a few grams of octahydrocoumarin, 5.5 g of 3,4-dihydrocoumarin, and 4.9 g of coumarin, at a conversion of 100%. The yield of 3,4,-dihydrocoumarin and coumarin was 53.7%.

EXAMPLE 5

Example 2 was repeated, except the 3,4,5,6,7,8-hexahydrocoumarin was replaced with 20 g of 6-methyl-3,4,5,6,7,8-hexahydrocoumarin, and the dehydrogenation reaction temperature was 260°–275°C. After 1 ¾ hours, the addition of the starting material was completed, and the reaction conditions were maintained for 2 ¼ hours, resulting in an overall reaction time of 4 hours.

The filtrate contained 0.3 g of unconverted starting material, 8.1 g of 6-methyl-3,4-dihydrocoumarin and 4.7 g of 6-methyl coumarin. The yeild of 6-methyl-3,4-dihydrocoumarin and 6-methyl coumarin was 66.9% at a conversion of 98.5%.

What is claimed is:

1. In a process for dehydrogenating a first compound of the formula

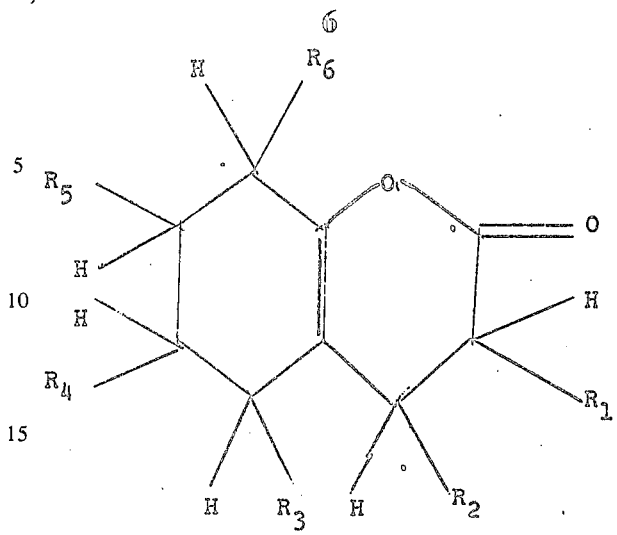

where $R_1$, $R_2$, $R_3$, $R_4$, $R_5$ and $R_6$ each independently represent hydrogen or lower alkyl, provided that the total number of carbon atoms in $R_1$–$R_6$ inclusive is at most 10, at a temperature of 150° to 400°C in contact with a catalytic amount of a metal dehydrogenation catalyst, wherein the metal is at least one metal of Group VIII of the Periodic Table to produce second compounds selected from the group consisting of dihydrocoumaurin and alkylated derivatives thereof, the improvement comprising conducting the dehydrogenation process in the liquid phase and at a temperature of 200° to 375°C while removing hydrogen from the reaction zone, and contacting the catalyst and the starting material at about the dehydrogenation temperature, whereby said first compound is obtained in the resulting reaction mixture in a molar ratio of said first compound: said second compound of at least 1:5.

2. Process according to claim 1, wherein the dehydrogenation temperature is 240°– 300°C.

3. Process according to claim 1, wherein said metal dehydrogenation catalyst is selected from the group consisting of palladium, platinum and rhodium.

4. Process according to claim 1, wherein said metal dehydrogenation catalyst is supported on an inert carrier.

5. Process according to claim 4, wherein said catalyst is palladium supported on carbon.

6. Process according to claim 1, wherein from 0.001 to about 1.0 weight percent, calculated as metal, of the catalyst is used, based on the weight of the starting material.

7. Process according to claim 1, wherein hydrogen is removed from the reaction zone by passage of an inert gas through said zone.

8. Process according to claim 1, wherein oxygen or an oxygen-containing gas is passed through the reaction mixture during the dehydrogenation.